United States Patent [19]

Dowell

[11] Patent Number: 4,924,619

[45] Date of Patent: May 15, 1990

[54] BOWFISHING BARBED TIP INCORPORATING POSITIVE BARB LATCH

[76] Inventor: Glen W. Dowell, 522 W. Nelda, Houston, Tex. 77037

[21] Appl. No.: 223,299

[22] Filed: Jul. 22, 1988

[51] Int. Cl.⁵ .............................................. A01K 91/06
[52] U.S. Cl. .............................................. 43/6; 43/5; 124/79; 273/419; 273/420; 273/421
[58] Field of Search .......................... 43/6, 5; 124/79; 273/419, 420, 421

[56] References Cited

U.S. PATENT DOCUMENTS

| | | | |
|---|---|---|---|
| 2,937,873 | 5/1960 | Grissinger | 273/419 |
| 3,036,396 | 5/1962 | Swails | 273/419 |
| 3,164,385 | 1/1965 | Shure | 273/419 |
| 3,168,313 | 2/1965 | Lint | 373/419 |

Primary Examiner—Kenneth J. Ramsey
Assistant Examiner—Michael William Starkweather

[57] ABSTRACT

An improved arrow tip with locking barb is shown. The tip is drilled by two spaced holes, and a spring wire is folded into four segments. A long segment is the wire barb, the next is a rotational portion for positioning in one of the holes and the last two segments position a lock tab in the second hole to assure positive barb locking.

7 Claims, 1 Drawing Sheet

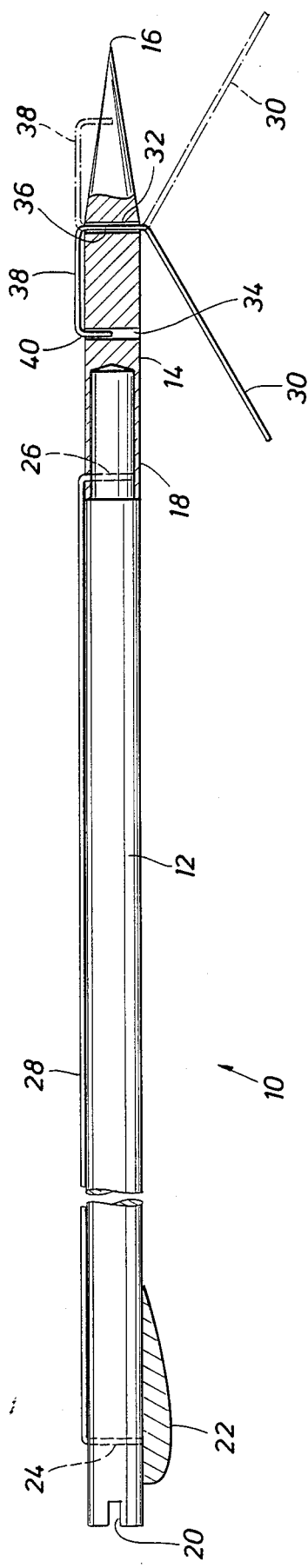

BOWFISHING BARBED TIP INCORPORATING POSITIVE BARB LATCH

BACKGROUND OF THE DISCLOSURE

The sport of bowfishing has increased markedly in recent times. Many field game hunters, faced with a very short season, have sought a year round supplement to the short game season typically occurring in the fall. One particular sport adjunct to bow hunting is fishing with bow and arrow. The present disclosure is directed to an improved tip for an arrow used in bowfishing. It is particularly advantageous in light of the fact that bowfishing can now be undertaken substantially throughout the year. One aspect of bowfishing which is available year round is the hunting of trash fish such as various types of carp, alligator gar, etc. all for the purpose of protecting game fish. Generally, regulatory agencies permit the taking of trash fish at all times of the year without limit.

The present apparatus has a barbed tip including a positive latch which assures proper barb latching when the arrow strikes a trash fish. Their skin may vary in toughness, but is particularly important to include a barb which will snag after entry when either passing all the way through the fish or pulling out after a glancing blow. As to the latter point, most bow fishing involves rather quick shots upward of 20 meters with a trajectory low to the water and hence optimum aim and impact is difficult to obtain. As the trash fish become bigger, they become much tougher, and possibly even more crafty. It is desirable to utilize a barb having a latch mechanism which is positive to assure that the arrow will stay lodged in the target fish and thereby not escape. On the other hand, the barb must unlatch to permit retrieval of the arrow after the fish has been retrieved and boated. It is therefore an object of the present disclosure to provide an arrow tip having a positive latching barb to assure barbed engagement of the fish until the fish has been boated and which barb can then be hand disengaged to permit easy retrieval of the arrow from the fish. There are other presently available arrow tips having spring wire barbs which rotate from a forward position to a rearward position. However, in one variety or another, they require unscrewing to operating or alternatively they are so loose that they tend to flop without control. The present apparatus utilizes a simple latch mechanism not requiring screws or threaded members so that the barb simply unlatches, swings 180° in rotation, thereby permitting retrieval of the tip through the captured fish, and easy reinstallation. When the barb is in the latched position, it is held positively. When the barb is in the second position, it is free to rotate. Shifting between the two positions is accomplished typically with a knife blade or other metal instrument for easy switching. At the time of latching, the protruding spring wire barb is rakishly swept backwardly from the tip to assure proper operation; it is almost impossible to loose the spring wire barb from the tip of the present invention.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawing illustrate only typical embodiments of this invention and are therefore not to be considered limiting of its scope, for the invention may admit to other equally effective embodiments.

The single FIGURE shows the latching barb of the present invention installed on an arrow for bowfishing and discloses rotational positioning of the barb from a locked and latched position to a second position for ease of retrieval of the arrow from a captured fish.

DETAILED DESCRIPTION OF THE PREFERRED EMBODIMENT

Attention is directed to the only view in the drawings where an arrow for use in bowfishing is illustrated. The arrow 10 is equipped with the latching barb of the present disclosure. The arrow 10 incorporates an elongate shaft 12 typically about 30 to 36 inches in length and made normally of composite plastic materials including glass fibers or the like. Metal shafts of aluminum also may be used. It is equipped with a metal tip 14 the tip incorporating a point at 16. It terminates at a surrounding sleeve 18 which is swaged onto the shaft 12 or otherwise affixed by suitable adhesives. The shaft terminates at an arrow nock 20 and suitable feathers or plastic membranes are included at 22 to serve as the flites for the arrow. Typically three are included.

This arrow is especially equipped for bowfishing. To this end, a hole 24 is drilled at the back end, and a similar parallel hole 26 is drilled through the forward portion of the arrow shaft. The two holes are used to receive a steel wire leader 28. The leader is used as an anchor point for a fishing line (not shown) so that the arrow can be retrieved after firing. The fishing line is connected with a leader 28. The two ends of the leader are fastened firmly at the holes 24 and 26 to assure that the arrow is not lost.

The present invention particularly focuses on the latching barb 30 shown at the tip. First of all, a suitable hole is drilled through the tip at 32. The hole 32 is parallel to a spaced hole 34. The two parallel holes pass all the way through the tip. They are drilled to a diameter of perhaps 3/32" which is a convenient size also for the holes 24 and 26. The two holes at 32 and 34 are sized to permit the spring wire barb 30 to loosely fit in the holes. The barb 30 is made of spring wire and has a diameter below 3/32" so that it will loosely rotate in the hole 32 as will be described.

The barb 30 is formed of spring wire which is folded into four separate segments. The barb segment is the longest and is in the range of about 1" to 2 ½" in length. It is folded at an angle of about 45° from a pivot section 36 which is slightly longer than the depth of the hole 32. A locking arm portion 38 is folded at a right angle and is positioned in a common plane with the other portions of the latching barb 30. An end portion is folded at 90° and comprises a locking tab 40. The locking tab 40 is folded so that it extends into the drilled hole 34.

It will be observed that there are three bends having a radius of curvature which is in part determined by the metal wire. It is desirable that the radius of curvature be such as to permit relative clearance for the pivot portion 36 to assure that it is not binding when positioned in the hole 32. Moreover, the radius of curvature positions the portion 38 away from the surface of the tip 14 sufficiently to enable a screw driver tip or a knife blade to be inserted underneath. This is involved in the latching and unlatching movement to be described. The locking tab 40 folds down into the hole 34. This requires control over the spacing or position of the locking tab 40. Moreover, it is desirable that the locking tab 40 have substantial length extending toward the hole 34. In the preferred embodiment, the tab 40 is positioned axially along the hole 34 to lock to the hole 34: in other words, the locking tab is sufficiently long to releasably lock or latch in the hole. The locking tab (beyond the radius of curvature) extends directly into the hole 34 to hold a releasable position. As noted before, all four of the segments of the barb lie in a common plane.

The tip 14 is preferably made of metal and the holes 32 and 34 are deburred so that the spring wire comprising the barb 30 smoothly engages the two holes without snagging.

Operation of the latching barb of the present disclosure is relatively straight forward. It is first installed in the dotted line position. This can be done by initially shaping the tabs 38 and 40 to provide two of the three bends in the wire stock comprising the latching barb. After it has been positioned in the hole 32, the bend for the barb is then applied. As will be understood, this bend does not have to be precisely at 45° and can easily vary by perhaps 10° or 15° from that angle. Bending secures the latching barb to the tip. The barb is then rotated from the dotted line position to the full line position; the locking tab 40 requires a modest amount of flexure so that the tab 40 is raised and poised over the hole 34. When alignment is accomplished, the tab pops into the hole 34 and the connection is made certain at that time. At this juncture, installation for fishing has been completed.

The arrow is fired in the conventional fashion during bowfishing and assuming that a fish has been struck, the arrow typically will penetrate substantially through the fish so that the tip emerges on the opposite side. Possibly the arrow will pass all the way through. In any case, the barbed tip (whether the tip emerges on the opposite side. Possibly the arrow will pass all the way through. In any case, the barbed tip (whether embedded in the fish or passing all the way through the fish) secures the arrow to the fish so that the fishing line can be retrieved and the fish is retrieved with the line. Once the fish is in the boat, the arrow can then be disengaged from the fish. By hand, the arrow is forced through the fish to expose the tip and the latching barb 30 is then fully on the far side of the fish. A screw driver tip, knife blade or other short metal fixture is inserted under the portion 38 and is lifted momentarily, typically by rotation, and the locking tab 40 is pulled free. When it pops out of the hole 34, the barb is then rotated 180° to the dotted line position. At that time the arrow can then be pulled from the fish. The arrow is then ready to be used on the next shot as soon after retrieval has been completed and the latching barb has been restored to the full line position.

The positive locking mechanism of the present invention is important. It is important that the latching barb hold the full line position until the fish has been boated. It is assured by virtue of the locking tab 40 which folds down into the drilled hole 34. That is, the locking tab 40 comprises means which assure that the barb holds the full line position until the fish has been retrieved. In many instances, the fish will fight, and the possibility of dislodging the arrow is great if the barb were to become unlatched. Fortunately, and in accordance with the present disclosure, the present latching barb tip assures that unlatching will not occur. In other words, the present apparatus holds the fish from launch of the arrow until the fish has been boated. The latching barb holds the full line position even in the midst of a vigorous fight from the fish to throw the arrow.

The present apparatus is ideally fabricated out of spring wire for the barb, a non-corrosive metal for the tip, and is fastened to either an aluminum or plastic composite material arrow shaft. While the foregoing is directed to the preferred embodiment, the scope thereof is determined by the claims which follow.

What is claimed is:

1. A game fishing tipped arrow including a latching barb which comprises:
   (a) an elongate arrow shaft;
   (b) a tip having a point on the forward end of said shaft;
   (c) rotatable spring wire latching barb means affixed to said tip and having a first position wherein said latching means positions a barb pointing backwardly from said tip, and further including locking tab means on said barb releasably engaging said tip at an opening in said tip for rotation to a second position such that said latching barb means can be disengaged from a fish after said tip and said latching barb means have entered the fish;
   (d) wherein said latching barb means is formed of a single piece of spring wire having four straight line segments and the fourth segment of said segments comprises said latching tab means at 90° with the connecting adjacent third straight line segment and is parallel with the second straight line segment; and
   (e) wherein said tip incorporates first and second parallel drilled passages therethrough, one of said passages releasably engaging said latching tab means and the second of said passages engaging the parallel straight line segment and permits rotational movement of said latching barb means.

2. The apparatus of claim 1 wherein said latching barb includes an outwardly projecting spring wire member bent at about 45° from the axis of said arrow shaft.

3. The apparatus of claim 2 wherein said bent portion has a radius of curvature connecting to a second portion of said spring wire, and said second portion is received within a drilled passage through said tip for rotational positioning of said locking barb.

4. The apparatus of claim 2 including an elongate shaft, and an elongate parallel wire leader connected at two ends of said leader to said shaft to enable connection with a fishing line.

5. The apparatus of claim 4 including an arrow nock at the rear of said arrow shaft.

6. The apparatus of claim 5 including flites on said arrow shaft near said arrow nock.

7. The apparatus of claim 6 further including a single point at the forward end of said shaft.

* * * * *